UNITED STATES PATENT OFFICE.

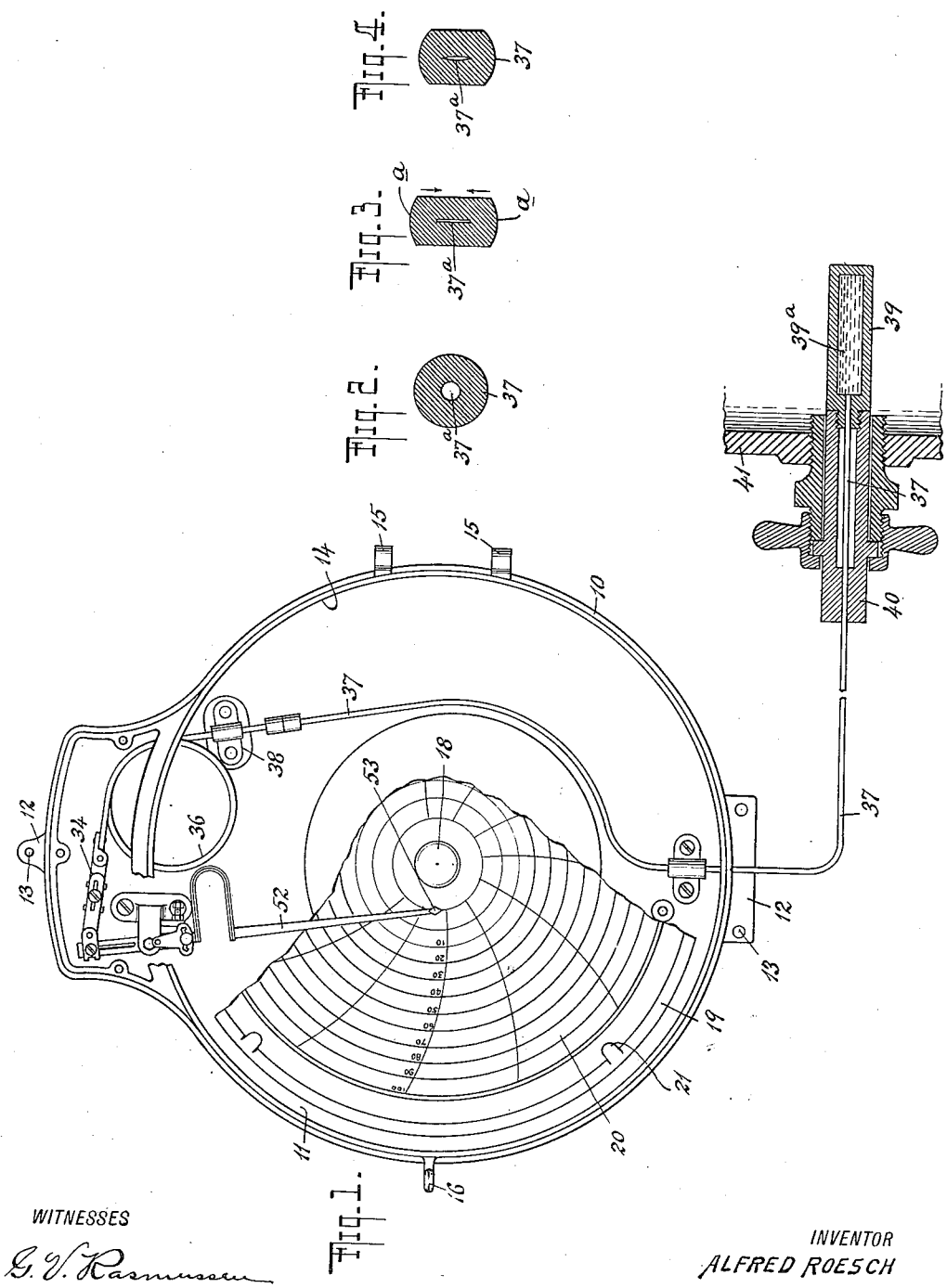

ALFRED ROESCH, OF BROOKLYN, NEW YORK, ASSIGNOR TO CHARLES J. TAGLIABUE MANUFACTURING CO., OF BROOKLYN, NEW YORK, A CORPORATION OF NEW YORK.

CAPILLARY TUBE AND PROCESS FOR MAKING THE SAME.

1,392,658.     Specification of Letters Patent.     Patented Oct. 4, 1921.

Original application filed April 7, 1917, Serial No. 160,352. Divided and this application filed July 27, 1918. Serial No. 247,052.

*To all whom it may concern:*

Be it known that I, ALFRED ROESCH, a citizen of the United States, and resident of the borough of Brooklyn, county of Kings, city and State of New York, have invented certain new and useful Improvements in Capillary Tubes and Processes for Making the Same, of which the following is a specification.

My invention relates to indicating and recording instruments and more particularly to that type of such instruments which are intended to indicate and record temperatures and has for its object the provision of an improved capillary tube whereby temperature changes are accurately indicated and recorded regardless of the location of my improved instrument relatively to the point at which said temperature changes occur. My invention further contemplates the provision of a simple and efficient method whereby said tube may be easily and cheaply produced. My invention will be fully described hereinafter and the features of novelty will be pointed out in the appended claims. The present application is a division of another application filed by me in the United States Patent Office on April 7, 1917, Serial No. 160,352.

Reference is to be had to the accompanying drawings which illustrate an example of my improvement and its use and in which Figure 1 illustrates my improved capillary tube in operative combination with my improved instrument illustrated in the parent application, referred to above; Figs. 2, 3 and 4 are cross sections of the capillary tube at successive stages in its construction.

As shown in the illustrated example, the instrument comprises a casing 10 of any suitable construction and arrangement, mounted upon or carried by a back plate 11 which is provided with lugs 12 having suitable apertures 13 for the accommodation of screws or other fastening devices whereby the instrument may be secured upon any convenient support. The front of the casing 10, as shown, may comprise a transparent door 14 hinged at 15 to said casing and locked in its closed position by means of a suitable catch 16. Within the casing 10 is located the customary clock work, the spindle 18 of which projects through the disk 19 which serves as a support for the customary chart 20 which is mounted upon the spindle 18 and secured thereon, said chart being guided by means of lugs 21 formed on the disk 19. As so far described, the arrangement may correspond to any well known construction.

The instrument further includes a pen arm 52 of any customary and suitable type and carrying the usual stylus or pen 53 which contacts with the chart 20 in the well known way. The pen arm 52 is pivotally mounted in the casing 10 and is operatively connected by means of a link 34 with the coil or active portion 36 of the capillary tube 37 which is, generally speaking, constructed of a suitable metal. A suitable bracket 38 mounted in the casing 10 supports the coil 36 in operative position. The tube 37 communicates with a bulb 39 carried in the customary manner by a support 40 adapted to connect the bulb 39 with the element 41 in which the temperature changes are to be indicated and recorded or to be supported at the point where such changes take place.

I have utilized the instrument and its coöperating elements shown in the parent application of which the present case is a division as a means for illustrating an operative embodiment of the present invention. It will be understood that this is only an example and that my improved capillary tube 37, to be specifically described hereinafter, is not limited to use with this instrument but, on the contrary, is adapted for efficient operative combination with any other recording or indicating instrument of the type in question.

It will be understood that the instrument is operated in the usual manner by means of the expansion and contraction of the mercury $39^a$ in the bulb 39 and capillary tube 37. Owing to the degree of pressure which the tube 37 in practice is called upon to resist, the walls of said tube are necessarily considerably thicker in cross section than the bore of the tube. Because of difficulties encountered in manufacturing it has heretofore been impossible to reduce the cross sectional dimension of said bore sufficiently to produce accurate temperature records, if the instrument is located at any distance from the bulb 39. This is due to the comparatively large volume of mercury contained in the capillary tube of ordinary construction, which throughout its length between the bulb and the instrument may be subjected to varying temperatures which affect said mercury and thus interfere with the action of the instrument. Many attempts have been made to bring about the necessary reduction of the bore, without, however, giving entirely satisfactory results. In consequence, very unsatisfactory and inaccurate records have been obtained in attempts to separate the recording instrument any considerable distance from the bulb 39. In order to overcome these serious objections and disadvantages and to provide an instrument which is efficient at all times, regardless of its location relatively to the bulb and which is extremely sensitive, I have provided a capillary tube in which the bore is reduced to a minimum corresponding in reality to a mere fissue in the tube and have further provided an improved method of making said tubing easily and cheaply.

In carrying out my improved process I first produce an ordinary tube 37 of circular cross section and having a bore $37^a$ of sufficiently large diameter to make it easy to produce, as shown in Fig. 2. The tube 37 is then flattened out in any suitable manner as for instance by passing it between a pair of suitable rollers which deforms the bore $37^a$ from a circular form in cross section to an elongated flattened form, as shown in Fig. 3, said bore, as a matter of fact, being substantially closed by this operation. In this condition pressure or any other force may be applied to the surfaces $a$ in the directions indicated by the arrows in Fig. 3 whereby the bore $37^a$ is again slightly opened to, for instance, approximately two one-thousandths of an inch as shown in Fig. 4 and is thus of the smallest posible or infinitesminal dimensions and corresponds in practice to a mere fissure in the tube.

Instead of subjecting the tube to a second pressure or other force to open up the bore, the tube, after being brought to the condition shown in Fig. 3 may be heated and then plunged into cold water. The sudden chilling of the metal will cause the same to contract and open up the bore to a slight extent in approximately the same way as previously described. It will be understood that the re-opening of the bore is of infinitesimal extent and ceases long before the bore reaches anywhere near its initial form or area.

The original bore is readily produced owing to its size, as shown in Fig. 2, and may be easily brought to its final stage by successive deformations of the tube in directions transverse to each other, or by first heating the metal and then chilling it, or by any other suitable method.

The operation results in a capillary tube 37 having a bore $37^a$ of the smallest dimensions and yet uniform throughout, and which for a tube of given length contains only a minimum quantity of mercury $39^a$. Thus, no matter how far the instrument is removed from the bulb 39 or how great the length of the tube 37, the interference by intermediate temperature variations will be so small as to be of no consequence and without effect on the operation of the instrument. Accurate and efficient indicating and recording are thus always assured.

Various changes in the specific form shown and described may be made within the scope of the claims without departing from the spirit of my invention.

I claim:

1. The process of making capillary tubes of metal which consists in first producing a metallic tube having a bore of materially less cross-sectional area than that of the tube itself, closing said bore by pressure exerted upon said tube in radial directions and reopening said bore to a limited, infinitesimal extent corresponding to a mere fissure in said tube.

2. The process of making capillary tubes of metal which consists in first producing a metallic tube having a bore of materially less cross-sectional area than that of the tube itself, closing said bore by a force exerted in one direction and reopening said bore, by a force exerted in a transverse direction, to an infinitesimal extent corresponding to a mere fissure in said tube.

3. The process of making capillary tubes of metal which consists in forming a circular bore in stock of circular cross-section, compressing said stock in one direction to close said bore and compressing said stock in a transverse direction to re-open said bore to an infinitesimal extent corresponding to a mere fissure in said tube.

4. A capillary tube of metal having a longitudinally extending bore, the cross-sectional dimension of which is greater in one direction than in a transverse direction, said bore representing a mere fissure in said tube.

5. A capillary tube of metal having a longitudinally extending infinitesimal bore of elongated cross-sectional form and representing a mere fissure in said tube.

In testimony whereof I have hereunto set my hand.

ALFRED ROESCH.